(12) United States Patent
Veach

(10) Patent No.: US 7,349,876 B1
(45) Date of Patent: Mar. 25, 2008

(54) DETERMINING A MINIMUM PRICE

(75) Inventor: Eric Veach, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 323 days.

(21) Appl. No.: 10/350,898

(22) Filed: Jan. 24, 2003

(51) Int. Cl.
*G06Q 40/00* (2006.01)
(52) U.S. Cl. ...................................................... 705/35
(58) Field of Classification Search ............. 705/35–45
See application file for complete search history.

(56) References Cited

U.S. PATENT DOCUMENTS 6,704,716 B1 * 3/2004 Force ........................ 705/80

OTHER PUBLICATIONS

Cash is the key to a true portal: Goto.com has found a way to make searching profitable in itself, in a radical departure from the service other sites and engines provide; [London edition] Jackson, Tim. Financial Times. London (UK): Feb. 2, 1999. p. 16.*

* cited by examiner

*Primary Examiner*—R. Weisberger
(74) *Attorney, Agent, or Firm*—Straub and Pokotylo; John C. Pokotylo

(57) ABSTRACT

Different minimum prices are assigned to different ad serving constraints (such as keywords, geolocations, serving times, etc.). A single auction minimum price may be determined for an auction using the minimum prices assigned to satisfied serving constraints of ads participating in the auction.

16 Claims, 5 Drawing Sheets

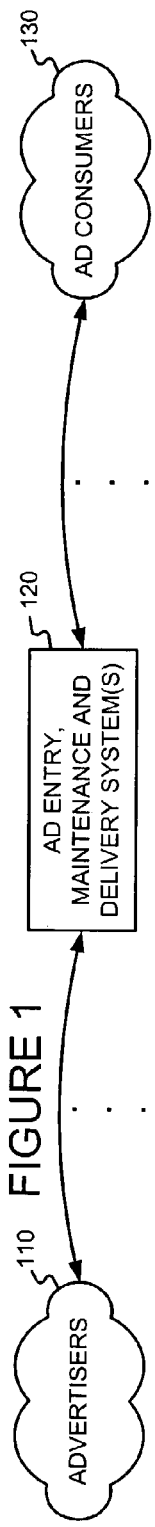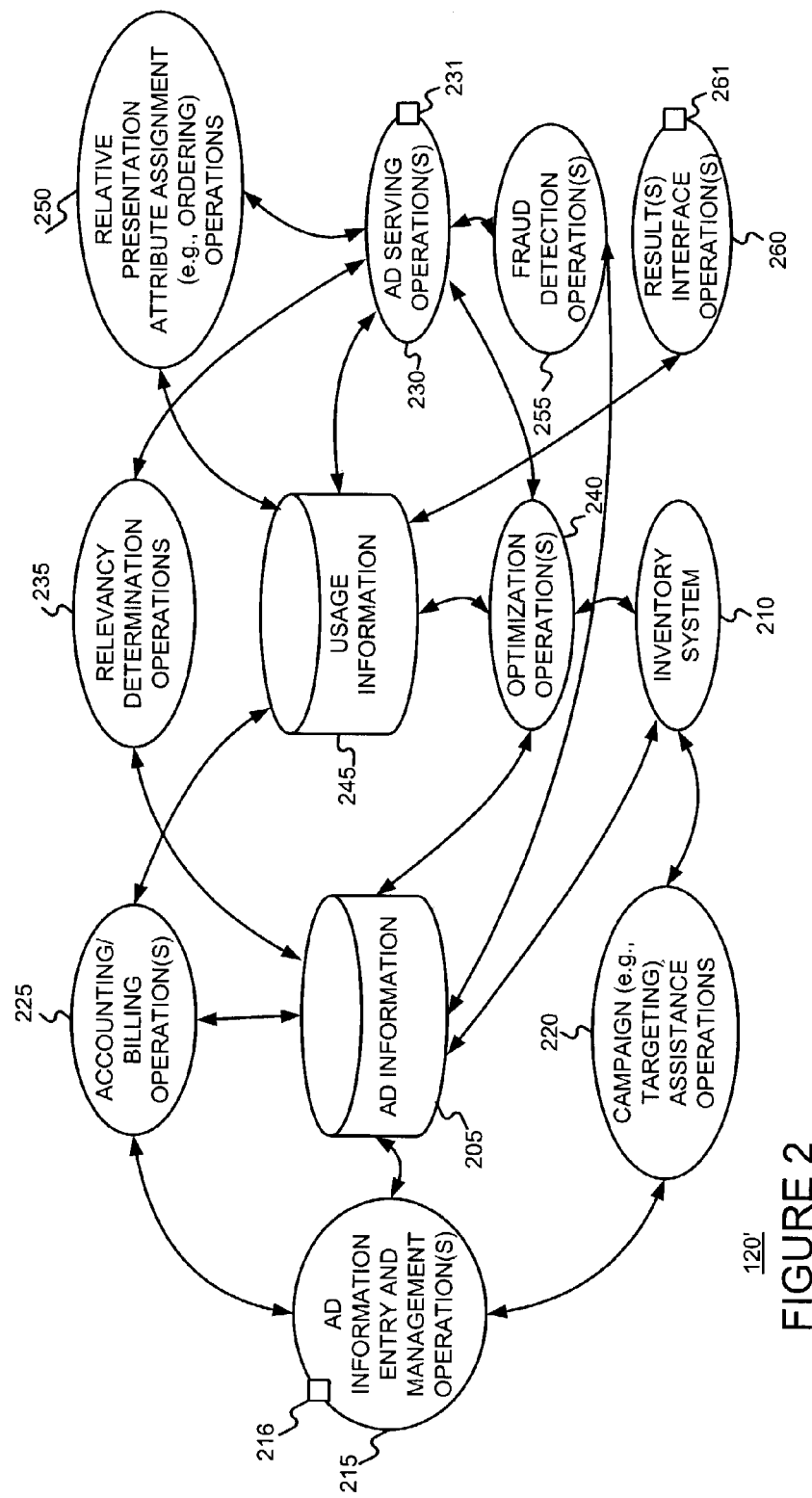

DETERMINING A MINIMUM PRICE

§ 0. RELATED APPLICATION

Benefit is claimed, under 35 U.S.C. § 119(e)(1), to the filing date of provisional patent application Ser. No. 60/439,354, entitled "SETTING MINIMUM PRICES IN AN ADVERTISING SYSTEM", filed on Jan. 10, 2003 and listing Eric Veach as the inventor, for any inventions disclosed in the manner provided by 35 U.S.C. § 112, ¶1. That provisional application is expressly incorporated herein by reference.

§ 1. BACKGROUND OF THE INVENTION

§ 1.1 Field of the Invention

The present invention concerns advertising. In particular, the present invention concerns determining a minimum price to be charged for serving an online advertisement.

§ 1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Web site. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's web page, and consummates a purchase there before leaving that web page. Alternatively, a conversion may be defined as a user being shown an ad, and making a purchase on the advertiser's web page within a predetermined time (e.g., seven days). Many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "Overture.com", which hosts a so-called "search engine" service returning advertisements masquerading as "search results" in response to user queries. The Overture.com web site permits advertisers to pay to position an ad for their Web site (or a target Web site) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Some online advertising systems permit advertisers to target the serving of their ads. Such systems may do so by allowing advertisers to place one or more serving constraints on an ad. One of the most popular serving constraints is setting one or more keywords such that an ad will only be served if at least some of the keywords "match" a search query, in an advertising system that serves ads with search results. Other serving constraints are possible.

Often, different advertisers want to reach the same target audience, and therefore would like their ads to be served subject to the same serving constraints. Accordingly, serving constraints can be thought of as targeting criteria. If there is a limited number of spots (also referred to as "inventory") for the competing ads, competition of competing ads from competing advertisers should be arbitrated. Similarly, competition for relative presentation attributes of ads, such as spatial or temporal positioning, size, etc., should also be arbitrated. Auctions are one way of arbitrating such competitions, such as competitions for keywords, competitions for relative placement, etc. In an advertising system where the serving of ads is subject to an auction, setting a minimum price for each auction can increase revenue, compared to an auction where no minimum prices are set. Conventional systems have used fixed minimum prices for all of their advertising inventory. However, different auctions can sell inventory with different underlying values. Thus, better ways of setting minimum prices are needed.

§ 2. SUMMARY OF THE INVENTION

Different minimum prices are assigned to different ad serving constraints (such as keywords, geolocations, serving times, etc.). A single auction minimum price may be determined for an auction using the minimum prices assigned to satisfied serving constraints of ads participating in the auction.

§ 3. BRIEF DESCRIPTION OF THE DRAWINGS

FIG. 1 is a high-level diagram showing parties or entities that can interact with an advertising system.

FIG. 2 is a bubble chart of an exemplary advertising environment in which, or with which, the present invention may operate.

§ 4. DETAILED DESCRIPTION

Figure 3:
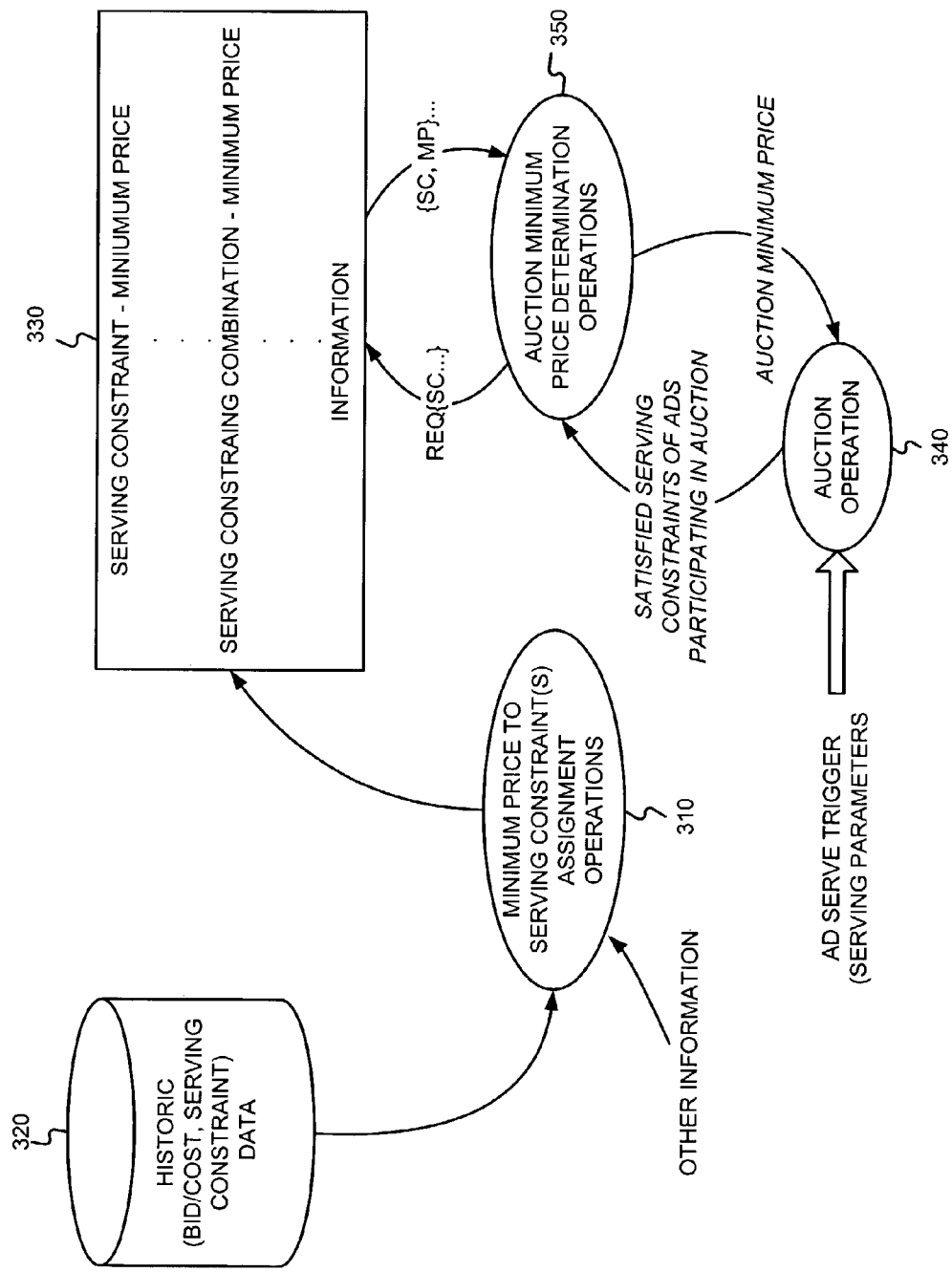
FIG. 3 is a bubble chart of operations that may be performed on data, consistent with the present invention.

The present invention may involve novel methods, apparatus, message formats and/or data structures for determining minimum prices for serving constraints, combinations of serving constraints, and actions related to the serving of an ad. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as any patentable subject matter described.

In the following, environments in which the present invention may operate are described in § 4.1. Then, exemplary embodiments of the present invention are described in § 4.2. Finally, some conclusions regarding the present invention are set forth in § 4.3.

§ 4.1 ENVIRONMENTS IN WHICH, OR WITH WHICH, THE PRESENT INVENTION MAY OPERATE

§ 4.1.1 Exemplary Advertising Environment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number of ads desired. The ad request may also include content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the viewer. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285, 999 (both incorporated herein by reference). Such search results may include, for example, lists of Web page titles, snippets of text extracted from those Web pages, and hyper-text links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

Finally, the search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

§ 4.1.2 Exemplary Ad Entry, Maintenance and Delivery Environment

FIG. 2 illustrates an exemplary ad system 120', consistent with principles of the present invention. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. Finally, the ad serving operations 230 may use relative presentation attribute assignment operations 250 to order the presentation of the ads to be returned. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

§ 4.1.3 Definitions

Online ads, such as those used in the exemplary systems described above with reference to FIGS. 1 and 2, or any other system, may have various intrinsic features. Such features may be specified by an application and/or an advertiser. These features may be referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When ad online ad is served, one or more parameters may be used to described how, when, and/or where the ad was served. These parameters may be referred to as "serving parameters" below. Serving parameters may include, for example, one or more of the following: features of a page on which the ad was served, a search query or search results associated with the serving of the ad, a user characteristic (e.g., their geographic location, the language they use, the type of browser used, previous page views, previous behavior), a host or affiliate site (e.g., America Online, Google, Yahoo) that initiated the request that the ad was served in response to, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as conditions or constraints. When used as serving conditions or constraints, such serving parameters may be referred to simply as "serving constraints". For example, in some systems, an advertiser may be able to specify that its ad is only to be served on weekdays, no lower than a certain position, only to users in a certain location, etc. As another example, in some systems, ad advertiser may specify that its ad is to be served only if a page or search query includes certain keywords or phrases.

User behavior can be any type of user behavior. However, the present invention is more useful if the user behavior is measurable or observable, and if the user behavior is one responsive to a served ad. Thus, for example, the present invention is more useful if the user behavior is a behavior such as a selection (e.g., a click-through), a selection rate (e.g., a click-through rate), stay time (the amount of time a user spends at a destination Web site) a conversion, a conversion rate, a referral to another party, etc. User behavior is normally a function of one or more ad features and/or one or more serving parameters.

An auction is a procedure for accepting competing bids and determining an absolute winner, or relative rankings. In the context of the present invention, a bid is typically made on one or more serving constraints, such as a keyword, a geolocation, a host site, etc. This is because advertisers typically want to target their ad(s) and defining serving constraints lets them do so. In the context of the present invention, bid units are typically a monetary amount (or some other unit of value) per a result (such as an impression (s), a clickthrough, a conversion, etc.). For example, typical bid units include cost per thousand impressions (CPM), cost per click (CPC), and cost per conversion or other action (CPA). The bids may be used by the auction to arbitrate among competing advertisers.

An exemplary environment in which ad position may be auctioned is described in utility patent application Ser. No. 10/112,656, entitled "METHODS AND APPARATUS FOR ORDERING ADVERTISEMENTS BASED ON PERFORMANCE INFORMATION", filed on Mar. 29, 2002 and listing Jane Manning, Salar Arta Kamangar, Eric Veach and Lawrence E. Page as inventors, utility patent application Ser. No. 10/112,654, entitled "METHODS AND APPARATUS FOR ORDERING ADVERTISEMENTS BASED ON PERFORMANCE INFORMATION AND PRICE INFORMATION", filed on Mar. 29, 2002 and listing Salar Arta Kamangar, Ross Koningstein and Eric Veach as inventors, utility patent application Ser. No. 10/340,543, entitled "AUTOMATED PRICE MAINTENANCE FOR USE WITH A SYSTEM IN WHICH ADVERSITEMENTS ARE RENDERED WITH RELATIVE PREFERENCES", filed on Jan. 10, 2003 and listing Eric Veach and Salar Arta Kamangar as inventors, and utility patent application Ser. No. 10/340,542, entitled "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION", filed on Jan. 10, 2003 and listing Eric Veach and Salar Arta Kamangar as inventors. Each of these applications is incorporated herein by reference.

Generally, a minimum price can be associated with anything expressed with a monetary unit. For example, in the context of a bid on a serving constraint (e.g., a bid for the keyword "flower"), a minimum price may be the minimum bid that will be considered for the serving constraint. As another example, in the context of an auction, a minimum price may be a minimum cost to be charged to an advertiser for serving its ad.

Various exemplary embodiment of the invention are now described in § 4.2.

§ 4.2 EXEMPLARY EMBODIMENTS

Some of the following exemplary embodiments are described with respect to an online advertising system used by a search facility that provides search results in response to queries, such as the one described in § 4.1 for example. In the exemplary online advertising system, advertisements have one or more associated keywords, typically defined by the advertiser. The advertisements may be served, perhaps subject to conditions and/or competition with other advertisements, if one or more of its keywords has a predefined relationship (e.g., a match) with terms or phrases of a query. Although some of the exemplary embodiments are described in the context of the foregoing online advertising system, the invention is not to be limited to such a system, and can be used with different systems. For example, an ad may be served in response to any ad serving trigger, not necessarily a search query. Accordingly, the invention may be used in many online contexts, not necessarily a search engine Web site. A keyword or keywords associated with an ad may be thought of more generally as a serving constraint. A relative position may be thought of more generally as a presentation attribute. A clickthrough rate or conversion rate may be thought of as a performance parameter, or more generally, as a user behavior, typically a user behavior responsive to a served ad.

FIG. 3 is a bubble chart of operations that may be performed on data, consistent with the present invention. Minimum prices may be assigned to serving constraints, and/or combinations of serving constraints, by operation 310. For example, one minimum price may be assigned to the keyword "rose", while another minimum price may be assigned to the keyword "flower". Further, the minimum price on the keyword "rose" sold in the United States can be different from the minimum price on keyword "rose" sold in Japan. The operation 310 may use one or more of several techniques for assigning a minimum price to a serving constraint (e.g., targeting criteria) or a combination of serving constraints. These techniques are described below.

Consistent with a first minimum price assignment technique, if there is historical data on costs that advertisers have paid in the past, and/or amounts that advertisers have bid in the past, this data can be used to set minimum prices. For example, if historical data shows that advertisers have paid between 60 cents and 80 cents for the keyword "carnations" in the past, a minimum price could be set using that data. In this example, the minimum price may be set at 70 cents to encourage reasonable bids while encouraging some advertisers to pay more. Given historical pricing data for a given serving constraint (e.g., a keyword), a minimum price for that serving constraint can be determined in a variety of ways. The historical prices can be combined using an average, weighted average, order statistic, or various other functions, etc. The historic price data can be filtered before averaging, by throwing away "outliers" (price samples where the price appears to be unusually high or low). The minimum price can be set to some function of the historical price paid, either lower (to encourage more advertisers to join) or higher (to obtain more revenue from existing advertisers). The minimum price can be set to maximize advertising revenue.

A more general technique for setting the minimum price for a serving constraint is to analyze historical data to determine what the effect (e.g., on revenue) of a price change would have. For example, the minimum price could be set such that at least 80% of the revenue from existing advertiser will be preserved. Thus, if a function of revenue with respect to minimum price can be discerned, a minimum price which maximizes the revenue function can be determined.

Finally, minimum prices can be set by experimentation. To determine the effects of a price change, prices can be varied and the results measured. This can be done either by changing the prices for a fraction of the advertisers, or by changing prices for a fraction of the ad requests (selected randomly, or by time of day, user id, etc). The results may then be compared from before and after the price change (e.g. revenue, user retention, advertiser retention, or other measures of interest) to determine whether the minimum price change is worthwhile. A possible price change can be evaluated by trying many variations at once. For example, the price could be perturbed randomly up or down according to a given distribution, and effects can be measured and correlated with the amount of the price change.

Regardless of the technique used, the minimum price to serving constraint(s) assignment operation 310 may be used to generate an association of a serving constraint to a minimum price, for each of one or more serving constraints, and/or an association of a serving constraint combination to a minimum price, for each of one or more serving constraint combinations. This is depicted as information 330 in FIG. 3.

As introduced above, conventional systems have used fixed minimum prices for all of their advertising inventory. However, different auctions can sell inventory with different underlying values. For example, if the auction is for ad positions on a search results page corresponding to a query entered by a user, then different queries may have different values to the advertisers (e.g. "online flower purchases" vs. "paper clips"). Auction minimum price determination operations 350 accounts for the fact that different auctions can be used to sell inventory with different underlying values. The operation 350 may determine an auction minimum price using the serving constraints (e.g., targeting criteria) of competing ads that "matched" or were otherwise satisfied by "serving parameters" associated with an "ad serve trigger" (e.g., a search query).

For example, the serving constraints may have been satisfied by, for example, a keyword match, a geographic location sourcing that search query, a time of day or year of the search query, a concept or category of the search query, host site which sourced the search query, etc. Furthermore, a keyword match could be an "exact" or "broad" match. There are various ways to define a broad keyword match, but one definition is that the user's query contains all of the words in the keyword target. For example, the query "online flower stores" would be a broad match for the keyword target "online stores", but not for the keyword targets "flower shops" (because the query does not contain the word "shops") or "new york online flower stores" (because the query does not contain the words "new" or "york").

Recall that a minimum price may have been assigned to each keyword chosen by an advertiser. For example, if the advertiser chooses to target ads to the broad keywords "flowers" and "roses", there might be a minimum price of 60 cents for "flowers" and 85 cents for "roses". If the advertiser participates in any auction that matches these targeting criteria, the advertiser will pay a price no less than the minimum price stated. For example, given the query "online flowers", an advertiser who targeted "flowers" would pay at least 60 cents.

To keep auctions fair it is desirable that there be a unique minimum price for each auction—that all advertisers are subject to the same "auction minimum price". However, ensuring fairness has the potential to create a problem when there are multiple serving constraints that "matched" or were otherwise satisfied by the serving parameters associated with an ad serve trigger (e.g., a search query). That is, different ads may be participating in the auction for different reasons (i.e., because different ones of their search constraints were satisfied). For example, if one ad targets "carnations" with a "carnations" keyword serving constraint, which has a minimum price of 50 cents, while another ad targets "roses" with a "roses" keyword serving constraint, which has a minimum price of 85 cents, it might be perceived as unfair if the two ads were subject to paying two different minimum prices in an auction on the query "carnations and roses", which satisfies the serving constraints of both ads.

This dilemma can be solved as follows. When an ad request is received, the serving constraints that were satisfied by the serving parameters of the ad serve trigger (e.g., based on a search query, page content, category, time of request, location of request, host, etc) can be determined. These satisfied serving constraints associated with ads participating in the action can be provided to the auction minimum price determination operations 350. The operations 350 may obtain the related minimum prices from 330. The operations 350 may use a (e.g., predefined) function to combines all of the "serving constraint minimum prices" and/or "serving constraint combination minimum prices" to obtain a single minimum price for the auction. For example, the serving constraint (combination) minimum prices could be combined by averaging, determining a weighted average, by computing the minimum, maximum, median, or some order statistic. The serving constraint (combination) minimum prices could also be combined using ad-hoc heuristics that give priority to some minimum prices over others (e.g. using the minimum price of the longest keyword that matches). This determined auction minimum price is applied to all advertisers participating in the auction.

§ 4.2.1 Exemplary Methods and Data Structures

Figure 4:
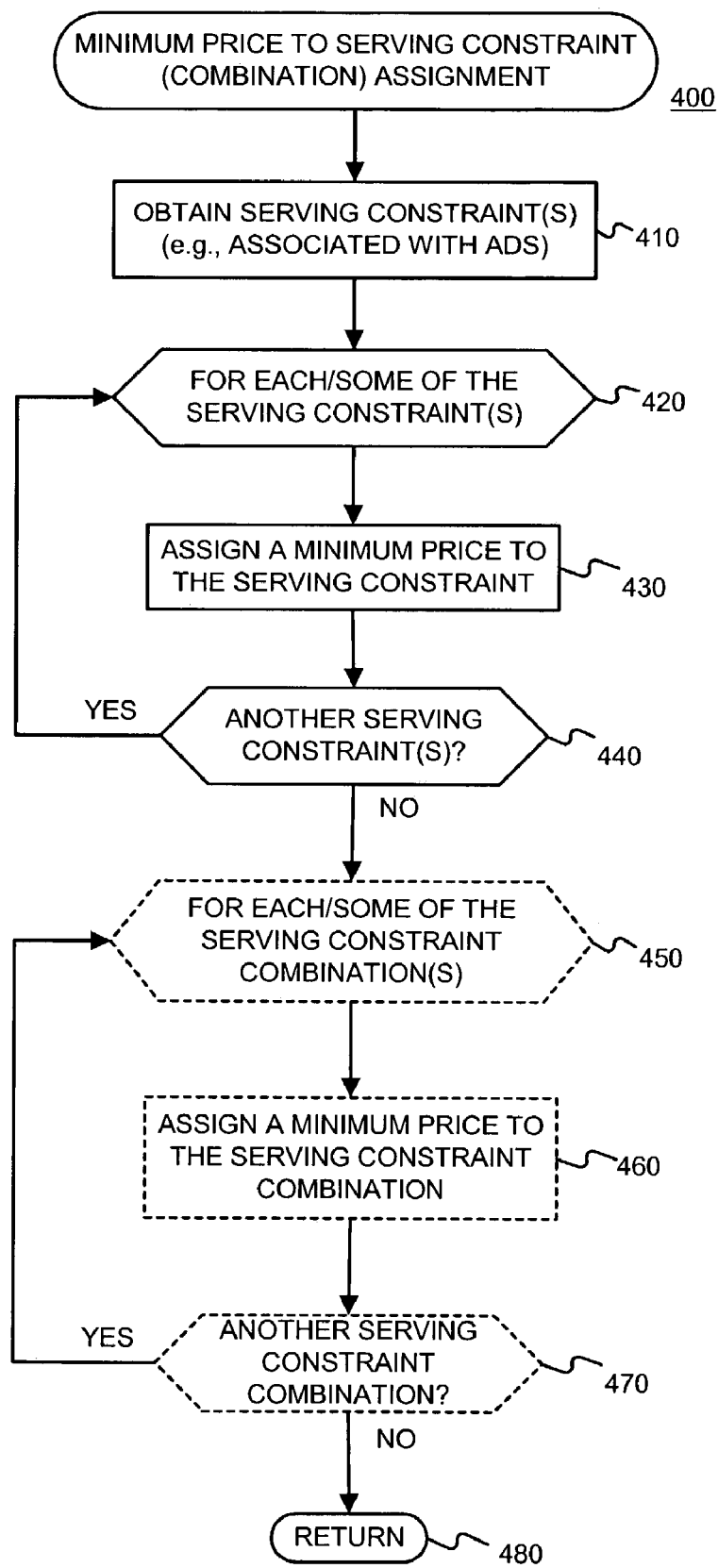
FIG. 4 is a flow diagram of an exemplary method that may be used to assign minimum prices to serving constraints, and/or serving constraint combinations, in a manner consistent with the invention.

FIG. 4 is a flow diagram of an exemplary method 400 that may be used to assign minimum prices to serving constraints, and/or to serving constraint combinations, in a manner consistent with the invention. Serving constraints (e.g., those already associated with ads) are obtained. (Block 410) For each of, or at least some of, the obtained serving constraints, a minimum price is assigned to the serving constraint. (Loop 420-440 and Block 430) Similarly, for each of, or at least some of, serving constraint combinations, a minimum price is assigned to the serving constraint combination. (Loop 450-470 and Block 460) Given the potentially huge number of serving constraint combinations, the method 400 could be limited to certain selected or popular serving constraint combinations.

Figure 5:
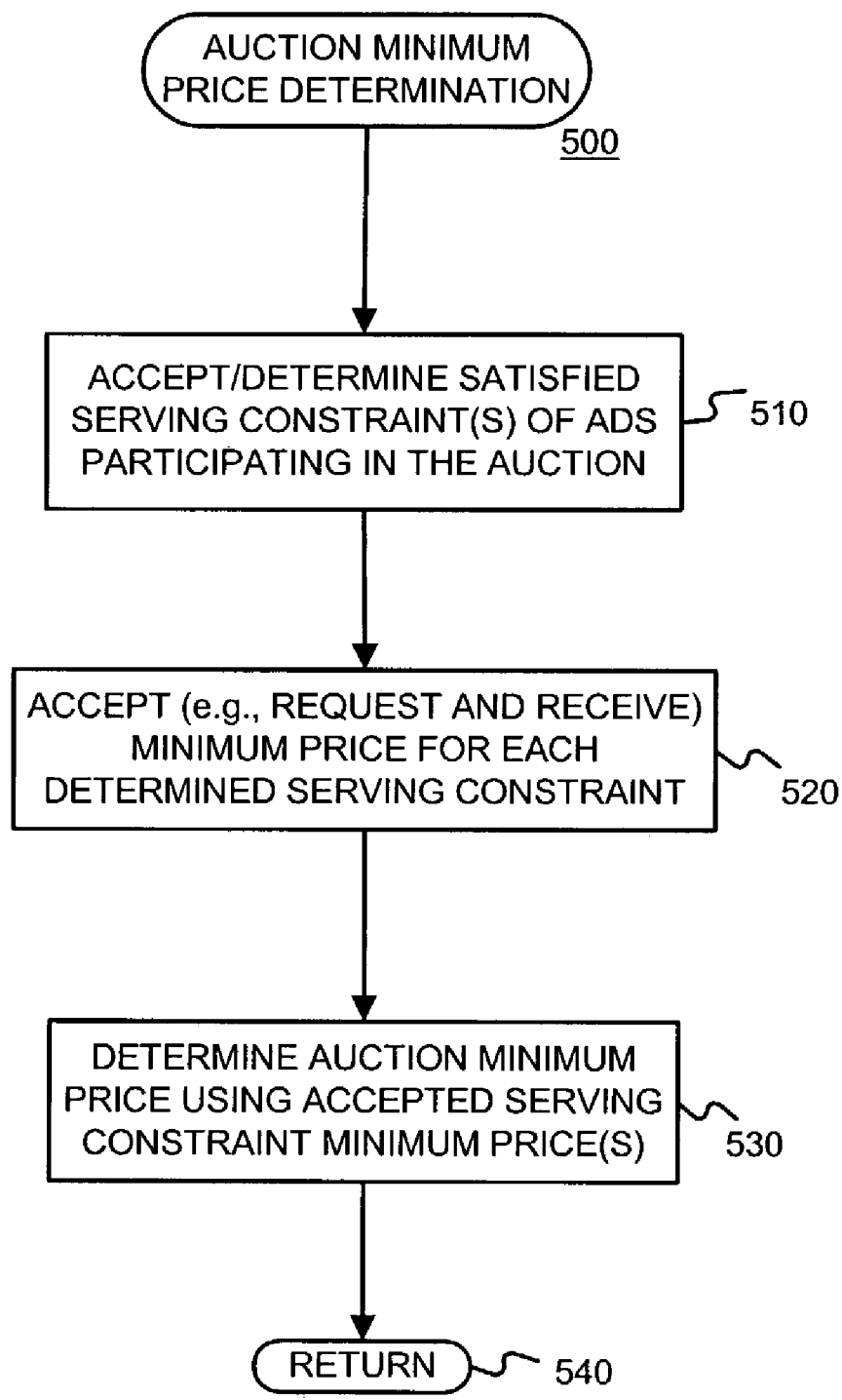
FIG. 5 is a flow diagram of an exemplary method that may be used to assign a minimum price to an auction in a manner consistent with the invention.

FIG. 5 is a flow diagram of an exemplary method 500 that may be used to assign a minimum price to an auction in a manner consistent with the invention. Satisfied serving constraint(s) and/or satisfied serving constraint combination (s) of ads participating in an auction are accepted or determined. (Block 510) Minimum prices for each of these serving constraint(s) and/or serving constraint combination (s) are accepted. (Block 520) Finally, an auction minimum price is determined using the accepted serving constraint (combination) minimum prices (Block 530) before the method 500 is left (Node 540).

§ 4.2.2 Exemplary Apparatus

Figure 6:
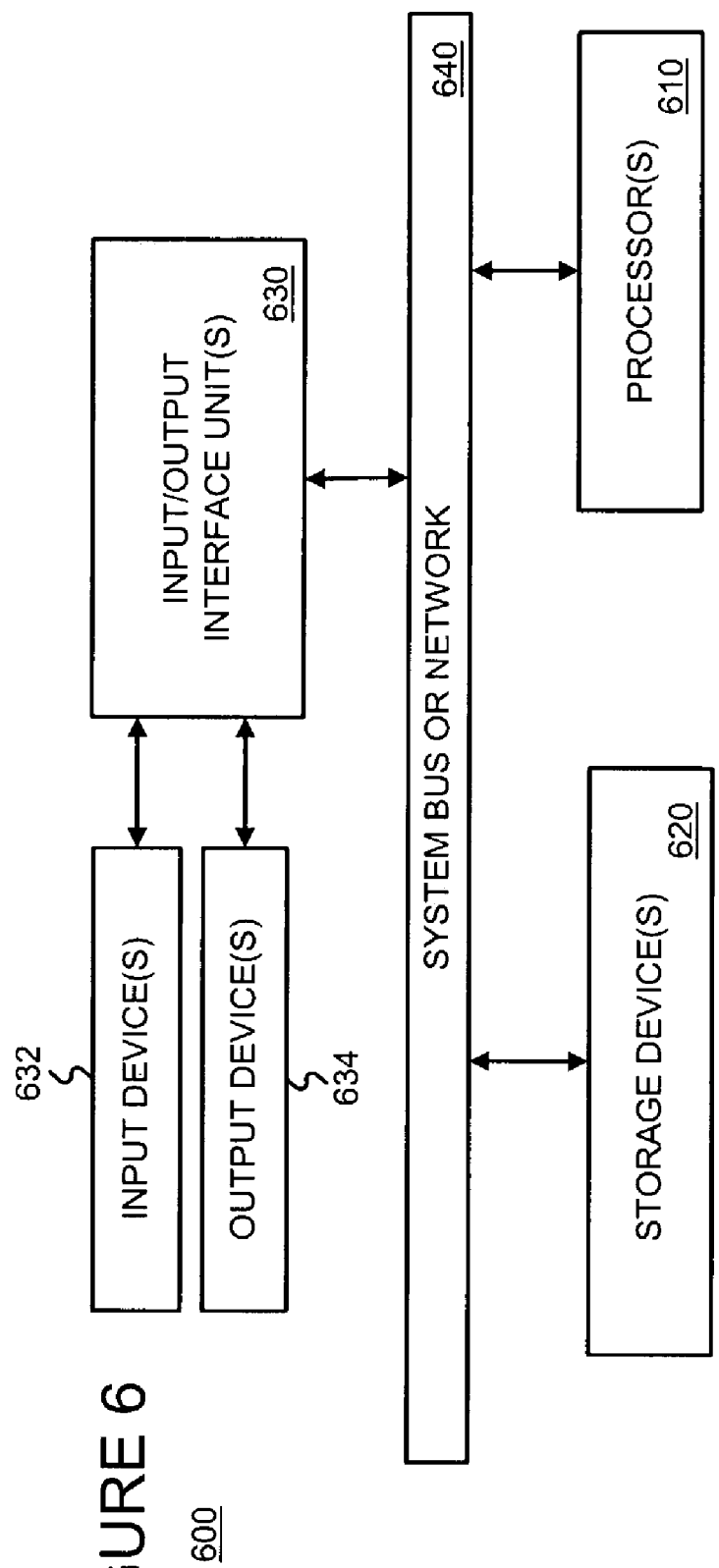
FIG. 6 is a high-level block diagram of apparatus that may be used to effect at least some of the various operations that may be performed in accordance with the present invention.

FIG. 6 is high-level block diagram of a machine 600 that may effect one or more of the operations discussed above.

The machine 600 basically includes a processor(s) 610, an input/output interface unit(s) 630, a storage device(s) 620, and a system bus or network 640 for facilitating the communication of information among the coupled elements. An input device(s) 632 and an output device(s) 634 may be coupled with the input/output interface(s) 630.

The processor(s) 610 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 620 and/or may be received from an external source via an input interface unit 630.

In one embodiment, the machine 600 may be one or more conventional personal computers. In this case, the processing unit(s) 610 may be one or more microprocessors. The bus 640 may include a system bus. The storage devices 620 may include system memory, such as read only memory (ROM) and/or random access memory (RAM). The storage device(s) 620 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 632, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 610 through an appropriate interface 630 coupled to the system bus 640. However, in the context of the accounting/billing operation(s) 225, no input devices, other than those needed to accept data, and possibly those for system administration and maintenance, are needed.

The output device(s) 634 may include a monitor or other type of display device, which may also be connected to the system bus 640 via an appropriate interface. In addition to (or instead of) the monitor, the personal computer may include other (peripheral) output devices (not shown), such as speakers and printers for example. Again, in the context of accounting/billing operation(s), no output devices, other than those needed to output billing information, and possibly those for system administration and maintenance, are needed.

§ 4.3 CONCLUSIONS

As can be appreciated from the foregoing disclosure, the present invention permits different minimum prices to be assigned to different serving constraints, and permits an auction minimum price to be determined.

What is claimed is:

1. A computer-implemented method for determining and applying a uniform auction-wide minimum price, the method comprising:
    a) receiving at least two serving constraints satisfying serving parameters associated with an ad serve trigger, of entities participating in an auction;
    b) reading from a storage device, at least two minimum prices associated with the at least two serving constraints;
    c) providing each of the at least two minimum prices as input to an operation, to generate an output defining the uniform auction-wide minimum price; and
    e) controlling serving of the entities by applying the uniform auction-wide minimum price to each of the entities participating in the auction such that each of the entities participating in the auction is subject to meeting the determined uniform auction-wide minimum price.

2. The computer-implemented method of claim 1 wherein the entities are advertisements and the serving constraints are selected from a group consisting of (A) words, (B) phrases, (C) locations, and (D) times.

3. The computer-implemented method of claim 2 wherein the minimum prices are selected from a group consisting of (A) a minimum price per impression, (B) a minimum price per selection, and (C) a minimum price per conversion.

4. The computer-implemented method of claim 1 wherein the operation determines, as the output, an average of the input at least two minimum prices.

5. The computer-implemented method of claim 1 wherein the operation determines, as the output, a maximum of the input at least two minimum prices.

6. The computer-implemented method of claim 1 wherein the operation determines, as the output, a minimum of the input at least two minimum prices.

7. The computer-implemented method of claim 1 wherein the operation determines, as the output, a median of the input at least two minimum prices.

8. A computer-implemented method comprising:
    a) determining a first set of one or more advertisements that have used a particular first serving constraint;
    b) determining first cost information associated with the particular first serving constraint by each of the determined first set of one or more advertisements;
    c) determining a first minimum cost using the determined cost information;
    d) storing, in a storage device, the first determined minimum cost in association with the particular first serving constraint;
    e) determining a second set of one or more advertisements that have used a particular second serving constraint;
    f) determining second cost information associated with the particular second serving constraint by each of the determined second set of one or more advertisements;
    g) determining a second minimum cost using the determined cost information;
    h) storing, in the storage device, the second determined minimum cost in association with the particular second serving constraint;
    i) reading from the storage device, the determined first and second minimum costs for use in an auction having at least one participating advertisement with the particular first serving constraint satisfied and at least one participating advertisement with the particular second serving constraint satisfied;
    j) providing the first and second minimum costs as input to an operation to generate an output defining a uniform minimum price for the auction; and
    l) controlling serving of each of the advertisements by applying the determined uniform auction minimum price to each of the advertisements participating in the auction such that each of the advertisements participating in the auction are subject to meeting the determined uniform auction minimum price.

9. The computer-implemented method of claim 8 wherein the first and second cost information are offers associated with the particular first and second serving constraints, and wherein the operation outputs one of (A) an average of the offers, and (B) a weighted average of the offers.

10. The computer-implemented method of claim 8 wherein the first and second cost information are offers associated with the particular first and second serving constraints, and wherein each of the offers is selected from a group of offers consisting of (A) an offer per impression, (B) an offer per selection, and (C) an offer per conversion.

11. The computer-implemented method of claim 8 wherein the first and second cost information are paid prices associated with the particular first and second serving constraints, and wherein the operation outputs one of (A) an average of the paid prices, and (B) a weighted average of the paid prices.

12. The computer-implemented method of claim 8 wherein the first and second cost information are paid prices associated with the particular first and second serving constraints, and wherein each of the paid prices is selected from a group consisting of (A) a paid price per impression, (B) a paid price per selection, and (C) a paid price per conversion.

13. The computer-implemented method of claim 8 wherein the first and second cost information are paid prices associated with the particular first and second serving constraints, and wherein the operation outputs a minimum price that would preserve at least a predetermined percentage of revenue from existing advertisers.

14. The computer-implemented method of claim 8 wherein the first and second cost information are offers associated with the particular first and second serving constraints, and wherein the operation outputs a minimum price that would preserve at least a predetermined percentage of revenue from existing advertisers.

15. The computer-implemented method of claim 8 wherein the first and second cost information are paid prices associated with the particular first and second serving constraints, and wherein the output of the operation maximizes a revenue function.

16. The computer-implemented method of claim 8 wherein the first and second cost information are offers associated with the particular first and second serving constraints, and wherein the output of the operation maximizes a revenue function.

* * * * *